United States Patent
Van Blerkom

(10) Patent No.: US 9,307,175 B2
(45) Date of Patent: Apr. 5, 2016

(54) INPUT OFFSET CANCELLATION FOR CHARGE MODE READOUT IMAGE SENSORS

(71) Applicant: Daniel Van Blerkom, Altadena, CA (US)

(72) Inventor: Daniel Van Blerkom, Altadena, CA (US)

(73) Assignee: Forza Silicon Corporation, Pasadena, CA (US)

( * ) Notice: Subject to any disclaimer, the term of this patent is extended or adjusted under 35 U.S.C. 154(b) by 288 days.

(21) Appl. No.: 13/902,205

(22) Filed: May 24, 2013

(65) Prior Publication Data

US 2014/0042301 A1    Feb. 13, 2014

Related U.S. Application Data

(60) Provisional application No. 61/681,351, filed on Aug. 9, 2012.

(51) Int. Cl.
| | | |
|---|---|---|
| H04N 5/20 | (2006.01) | |
| H04N 5/378 | (2011.01) | |
| H04N 5/357 | (2011.01) | |

(52) U.S. Cl.
CPC ............ *H04N 5/378* (2013.01); *H04N 5/3575* (2013.01)

(58) Field of Classification Search
CPC .......................... H04N 5/378; H04N 5/3575
USPC ................... 250/208.1, 214 R, 214 A, 214.1; 257/290–292, 440; 348/294–311
See application file for complete search history.

(56) References Cited

U.S. PATENT DOCUMENTS

| | | | |
|---|---|---|---|
| 6,587,143 B1 * | 7/2003 | Boisvert ........................ | 348/241 |
| 6,801,258 B1 * | 10/2004 | Pain et al. ..................... | 348/302 |
| 2008/0204567 A1 * | 8/2008 | Xu ............................. | 348/222.1 |

* cited by examiner

*Primary Examiner* — Tony Ko
(74) *Attorney, Agent, or Firm* — Law Office of Scott C Harris, Inc

(57) ABSTRACT

An image sensor system that compensates the amplifier in a column of a pixel array. This uses a sampling capacitor, that receives a signal from a pixel of the pixel array. A first plate of the sampling capacitor receives a value from the amplifier representing an offset level of the amplifier. While receiving the offset level from the amplifier on the first plate, the capacitor receives information from the pixel on a second plate of the same capacitor that is receiving the offset, thereby canceling the offset. The value from said sampling capacitor indicative of said information from said pixel with said offset cancelled being coupled to said amplifier to amplify said value as a first pixel value. The amplifier is also connected to other selecting switches from other pixels of said column of the pixel array.

14 Claims, 4 Drawing Sheets

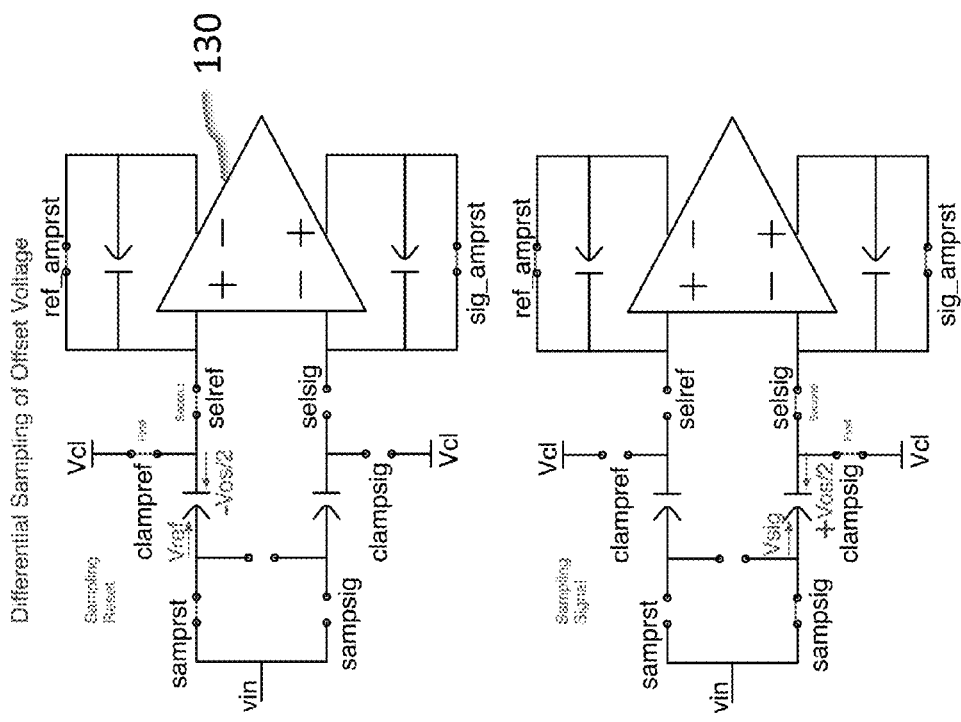
New Fig 4 – Differential Input Offset Storage Pixel Sampling

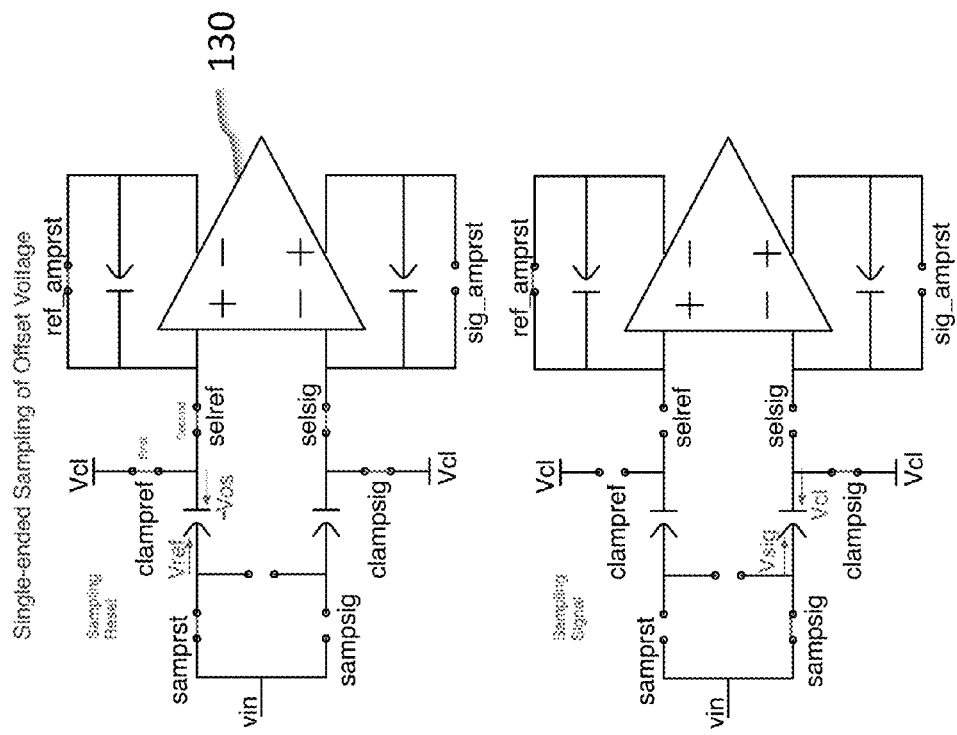
New Fig 5 – Single-ended Input Offset Storage Pixel Sampling

INPUT OFFSET CANCELLATION FOR CHARGE MODE READOUT IMAGE SENSORS

This application claims priority from Provisional application No. 61/621,229, filed May 24, 2012, and from 61/681,351 filed Aug. 9, 2012, the entire contents of both of which are herewith incorporated by reference.

BACKGROUND

Scaling the number of columns for high-resolution image sensors while maintaining the frame rate becomes difficult, as the speed of the readout amplifier trades off with its size, area, and noise performance. One solution is to break the larger sensor into multiple, smaller, charge-mode readout signal paths. In this case, however, the offset of the readout amplifiers will introduce fixed pattern noise, in the form of different offsets for the sub-arrays connected to each readout amplifier.

Input offset storage can be implemented for the readout amplifier by the addition of offset storage capacitors. However, this technique suffers from the additional area required for the capacitors, and the risk of introducing row-correlated noise.

SUMMARY

This invention implements offset correction by using input offset storage directly on the sampling capacitors.

Embodiments describe both differential and single ended operations.

BRIEF DESCRIPTION OF THE DRAWINGS

In the Drawings:

FIG. 4 shows the offset storage in differential operation; and

FIG. 5 shows the offset storage in single ended operation.

DETAILED DESCRIPTION

Figure 1:
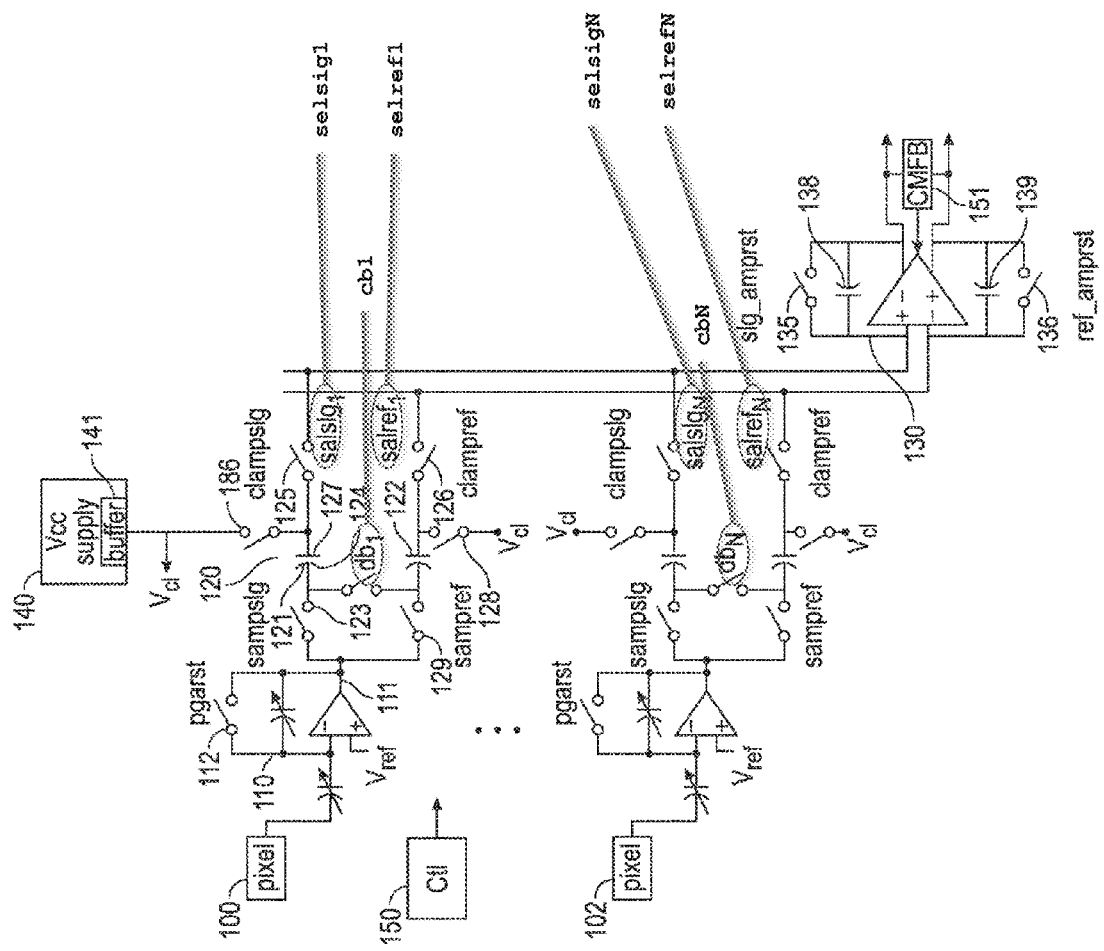
FIG. 1 shows a block diagram of an image sensor array.

Hardware used according to the embodiment is shown in FIG. 1. FIG. 1 shows receiving information from pixels 100, 102, but more generally receives the information from all of the pixels of an entire pixel array. The charge from the pixel 100 is integrated through a charge mode amplifier 110 into a sample and hold circuit 120. The output of the sample and hold circuit 120 is switched through a selector switch 125 and sent to an amplifier and buffer circuit 130. The output of the amplifier and buffer circuit 130 may then be A/D converted, and otherwise processed.

In order to maintain noise at a minimum level, both signal and reset levels from each pixel are sampled.

During the sampling of the signal and reset levels from the pixel array, the top plates of the column sample and hold capacitors are clamped to a reference voltage Vcl as described herein. After sampling, the resultant signal is supplied to the amplifier 130, by closing the crowbar switch ("cb"). The sampling happens sequentially; either the signal level followed by the reset level for a 3-T pixel readout scheme, or reset followed by signal for a 4-T pixel readout scheme.

After the sampling is complete, the columns are read out one-by-one through the amplifier 130. The amplifier in an embodiment is a switched capacitor gain amplifier. For each column, the readout amplifier 130 is first reset, and then the column capacitors are connected to the amplifier and the charge is transferred from the column capacitors to the feedback capacitors of the readout amplifier, by closing the crowbar switch ("cb"). For example, the capacitor 121 may be switched to be connected to the capacitor 138. The output of the readout amplifier thereby produces a voltage which represents the difference between the pixel reset and signal voltages, multiplied by a gain which depends on the ratio of the sampling capacitor 121 to the feedback capacitor 138.

The output also includes the input offset voltage of the amplifier 130, as no input offset cancellation mechanism is included in the circuit. This is not typically an issue for a single readout amplifier, since the offset is small (on the order of 10 mV), and it affects all of the pixels in the array uniformly.

However, when multiple gain amplifiers are used, their offsets may vary.

An embodiment describes cancelling the offsets introduced by the gain amplifiers in a charge-mode readout image sensor. Cancelling offsets is especially important when multiple charge-mode signal paths are used for a single imager array. Multiple signal paths are used, for example, to increase the speed of the image sensor readout, to reduce noise by reducing parasitic loading, or both. However, the use of the multiple signal paths can cause pattern noise, if any offsets or noise on the two paths are not matched.

A first embodiment describes a Differential Input Offset Storage. This first embodiment uses the circuit and structure shown in FIG. 1. An array of pixels, shown generically as 100, 102, produces their output which is initially buffered by a charge mode amplifier 110. The output 111 of the charge mode amplifier 110 is coupled to a sample and hold circuit 120. The sample and hold circuit includes a first sample and hold capacitor 121, and a second sample and hold capacitor 122.

Figure 2:
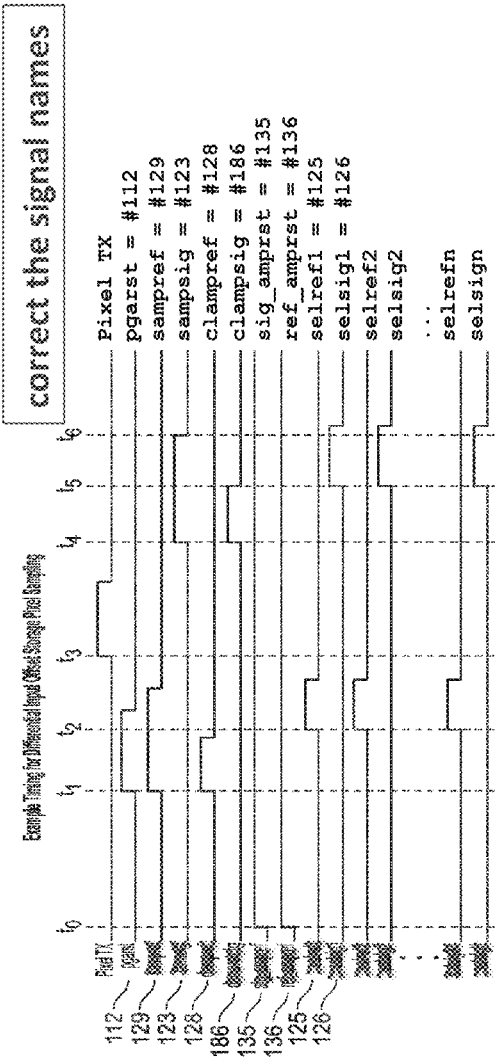
FIG. 2 shows a timing diagram for a differential mode operation.

In operation of this embodiment, also shown in the timing diagram of FIG. 2, the switches and operations are controlled by a controller 150 according to the timing diagram. Time t0 begins the cycle by bringing both the signal and reference out of reset. At time t1, pgarst 112 is brought out of reset.

The readout operation is started by coupling the top plate 127 of the sample and hold capacitor 121 to the input of the readout amplifier 130 by closing the switch 125 at time t2. At that same time, the readout amplifier is held in reset since its reset switches 135, 136 are being held in reset. This causes the amplifier offset, which appears on the amplifier inputs when in reset, to be stored on the top plate of the sampling capacitors. When the column is later selected for read out, the amplifier offset will be cancelled, since that charge has been stored on the top plate of the capacitor 121.

The reason for clamping to Vcl initially is that this allows any large current spikes due to charging/discharging of the capacitors to be absorbed by buffer circuitry 141 in the power supply 140 that creates the clamping voltage Vcl buffer circuitry, and not by the amplifier 130.

After the initial transient, the amplifier 130 is switched in at time t4 to finish the clamping operation and settle the top plate to the offset voltage. This eases the drive requirements on the readout amplifier, since it only needs to settle the capacitive load, and does not need to provide slewing current.

The sample switch 123 is closed during the time that the signal is being received from the pixel, time t4 in FIG. 2. This couples the pixel output to the bottom plate 124 of the sampling capacitor 121. In one embodiment, while sampling the pixel output on to the bottom plate, the top plate of the sampling capacitor is initially clamped to the clamping voltage Vcl by closing the clamp signal switch 186 at that same time.

Note from the FIG. 2 embodiment, half of the input offset correction is stored on one sample capacitor 121, and the other half is stored on the other sample capacitor 122. These values are correspondingly transferred to the respective feedback capacitors 138, 139 of the readout circuit 130. Thus, the offset voltage of the amplifier appears differentially on its outputs during reset.

In the first embodiment, the stability of the amplifier common mode may be critical between the sampling of any two pixel values. Any variation of the common mode between the two sampling points will appear as row-correlated noise in the image.

The common mode voltage (CM) of the differential amplifier 130 is defined as the average value of its differential output voltages. A common mode feedback (CMFB) circuit 151 is a typical component of a differential amplifier which monitors and adjusts the common mode voltage to maintain the CM at some fixed voltage level and is included within the amplifier 130. Since the common mode feedback (CMFB) circuit sets the common mode of the amplifier, the performance of the first offset correction method depends on the noise, stability, and power supply rejection performance of the CMFB circuit.

FIG. 2 illustrates a timing diagram of the first embodiment using the differential input pixel sampling, as described above. First, at a first time t0, the amplifier reset signals which control the switches 135 and 136 are brought high, thus putting the amplifier in reset. After settling time, a time t1, the buffer amp is reset by closing the buffer reset switch 112. At the same time, the sample capacitor is made active, by closing the sampling switch 123, thus coupling the output 111 of the charge mode amplifier through the sampling switch to the sampling plate 124 of the capacitor. The clamp is also brought active, closing switch 128, and coupling the clamping voltage to the top plate of the capacitor 122. The clamp is brought low after a short time at time t2, the output switches 125 and 126 are turned on. Note that the similar switches may also be turned on for the other sampling capacitors, shown by the signal selsigN.

The signal pixel TX is brought active for a short time starting at time t3. The TX signal transfers the collected charge in the pixel from the photodiode to the floating diffusion node, so that it can be read out on the pixel output lines. At time t4, the signal is sampled by bringing switch 123 active and at the same time providing the clamp reference to the other side of the capacitor by closing the switch 126. The switch 126 is closed only for a short time until the time t5. The sampling signal stays active, however until the time t6, sometime after t5. Also around the time t5, the select signals are brought active, to close the switches 125 and 126, to provide the sampled pixel signal to the amplifier 130. In this way, the capacitor top plates are initially charged to the offset voltage of the amplifier, while the bottom plates are charged to the signal and reset levels. When the capacitors are read out at a later time through the amplifier, the offset voltage is effectively cancelled, since it has been compensated for during the sampling phase described above.

Figure 3:
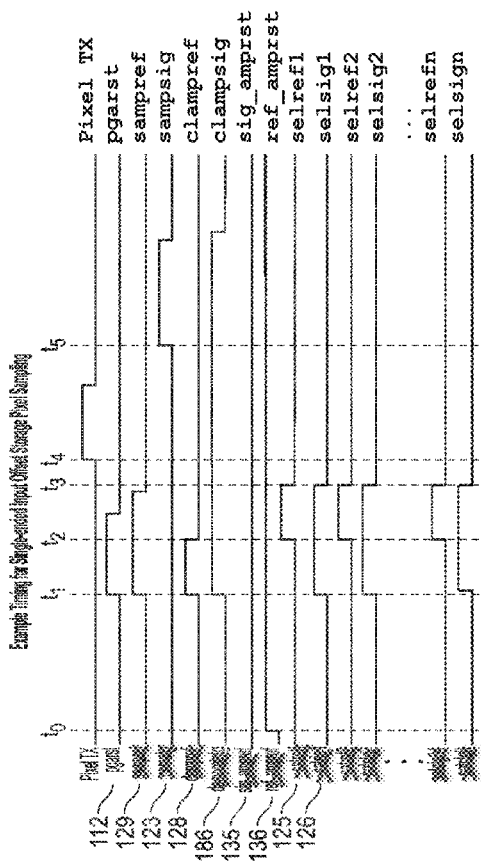
FIG. 3 shows a timing diagram for a single mode operation.

FIG. 4 shows the amplifier in differential mode. A second embodiment uses single-ended Input Offset Storage. The second embodiment uses the same structure shown in FIG. 1, but with a different timing diagram as shown in FIG. 3. In the second embodiment, the switches are connected to operate the differential readout amplifier 130 in a single-ended fashion as shown in FIG. 5, thus reducing the effect of the variations in the common mode voltage of the amplifier.

This is accomplished by driving the Vcl voltage into one input of the differential amplifier by closing the switches 125 and 126, while resetting the other side of the amp 130 by closing switch 136. This causes the full input offset voltage to appear on the side of the differential amplifier 130 that is being reset, unlike the first embodiment where the input voltage is being split between the two sides. This offset is stored on only the one sample capacitor 121. The other sample capacitor 122 is clamped to Vcl, i.e. it contains no offset.

In this mode of offset correction, the noise performance of the reference voltage Vcl, and not the CMFB circuit, becomes critical to the row-correlated noise performance of the readout. This is advantageous, since the Vcl driver can be optimized for low noise without regard to any common mode tracking requirements.

The signals are subsequently read out, but as read out have been compensated for the offset values.

FIG. 3 shows a timing diagram for the second embodiment.

In the second embodiment, at time t0, the reference amplifier side is maintained in reset, but not the signal amplifier side. This is done by holding switch 136 closed.

At time T, the charge mode amplifier 110 is reset by closing switch 112. At the same time, switch 129 is closed, and the top plate 127 of the sample and hold capacitor 121 is held to the clamping reference by closing switch 186. At that same time, both top plates are connected to the respective inputs of the differential amplifier, by closing switches 125 and 126. The clamp signal on the reference side is brought low at time t2 by opening switch 128, and it the same time, the switch 126 is closed at or around time t3. The pixel active period begins a short time after T3 at time t4. At time t5, the pixel value is coupled to the bottom plate 124 of the capacitor, by closing switch 123.

An analysis of the effect of common mode voltage variations on the two offset cancellation methods follows.

For the first embodiment of differential input offset storage, when the readout amplifier is held in reset, the voltages stored on the top plates of the sampling capacitors are:

$$V_{top,ref} = V_{cm}(t_0) - \left(\frac{A}{A+1}\right)\frac{V_{os}}{2} \approx V_{cm}(t_0) - \frac{V_{os}}{2}$$

$$V_{top,sig} = V_{cm}(t_1) + \left(\frac{A}{A+1}\right)\frac{V_{os}}{2} \approx V_{cm}(t_1) + \frac{V_{os}}{2}$$

Where t0 and t1 are the times at which the reference and signal voltages finish sampling onto the sampling capacitors. If the open-loop gain of the readout amplifier is high enough, the term (A/A+1) becomes approximately 1, and the equations simplify as shown above. Half of the amplifier offset appears on each side of the sampling capacitor network. Note that any change in the common mode voltage Vcm will appear in the stored offset voltage, without any attenuation—hence the noise sensitivity to the CMFB operation of the amplifier.

For single-ended input offset storage, the voltages stored on the top plates of the sampling capacitors are:

$$V_{top,ref} = V_{cl}(t_0)$$

$$V_{top,sig} = \left(\frac{A}{A+2}\right)(V_{cl}(t_1) + V_{os}) + \frac{2}{A+2}V_{cm}(t_1) \approx V_{cl}(t_1) + V_{os}$$

The offset of the amplifier appears on the signal capacitor only, instead of being divided by 2 as in the differential case. The effect of the common mode voltage is attenuated by a factor of (A+2)/2, which for large values of A goes to zero. However, instead of the Vcm voltage, now the Vcl voltage can introduce noise if it changes between t0 and t1. As mentioned above, the Vcl voltage buffer can be optimized without concern for the operation of the common mode feedback circuit of the amplifier, which allows for a lower noise and/or lower power implementation.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of circuits can be controlled in this way. Most generally, this technique could be used in circuits other than an image sensor that carry out array readout of differential analog voltages. For example, this could be used with capacitive sensors.

The above describes sampling the pixels and storing the value on the capacitors, also storing the offset from the readout amplifier on those same capacitors to cancel that offset. When those capacitors are read out, the offset has been removed. Other circuits can be used to obtain similar results.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor can be used to control the operation, or alternatively the operation can be controlled by a controller. The processor may be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An image sensor system, comprising:
    an amplifier that amplifies an input signal from a column of a pixel array;
    a sampling capacitor, that receives a signal from a pixel of said pixel array, an output of which is connectable to said amplifier; and
    a controller, that initially controls connecting a first plate of said sampling capacitor to receive a value from the amplifier representing an offset level of the amplifier, and while receiving the offset level from the amplifier on the first plate, receives information from said pixel on a second plate of the same capacitor that is receiving the offset, thereby canceling the offset,
    a selecting switch that is selected by said controller, to couple a value from said sampling capacitor indicative of said information from said pixel with said offset cancelled being coupled to said amplifier to amplify said value as a first pixel value,
    wherein said amplifier is also connected to other selecting switches from other pixels of said column of the pixel array.

2. The system as in claim 1, wherein the amplifier is a differential amplifier.

3. The system as in claim 2, wherein the differential amplifier uses switched capacitors.

4. The system as in claim 2, wherein the system includes both sample and reset sampling capacitors, both of said capacitors receiving said offset, and said capacitors receiving respectively sample and reset signals, and said capacitor providing said signals to respective inputs of said differential amplifier.

5. The system as in claim 2, wherein said differential amplifier is driven as a single ended amplifier.

6. The system as in claim 5, wherein an entire amount of the offset is driven onto one capacitor.

7. The system as in claim 1, further comprising another switch and a power supply, that initially charges said sampling capacitor to a clamp level.

8. The system as in claim 7, where the power supply includes buffer circuitry to absorb current spikes.

9. A method of operating an amplifier in a column of an image sensor, comprising:
    receiving a signal to be amplified from a column of an image sensor on a sampling capacitor;
    controlling a connection of said signal, to initially connect said capacitor to receive a value from the amplifier on a first plate of the capacitor, said value representing an offset level of the amplifier,
    while receiving the offset level from the amplifier on the first plate of the capacitor, receiving information to be amplified, to a second plate of the same capacitor that is receiving the offset, thereby canceling the offset,
    a value from said sampling capacitor with said offset cancelled being coupled to said amplifier to amplify said value as a first pixel value,
    connecting said amplifier to other selecting switches from other pixels of said column of the pixel array.

10. The method as in claim 9, wherein the amplifier is a differential amplifier.

11. The method as in claim 10, further comprising driving said differential amplifier as a single ended amplifier.

12. The method as in claim 11, further comprising driving an entire amount of the offset onto one capacitor.

13. The method as in claim 10, further comprising operating the differential amplifier using switched capacitors.

14. The method as in claim 10, wherein the capacitor includes both sample and reset sampling capacitors, both of said capacitors receiving said offset, and said capacitors receiving respectively sample and reset signals, and said capacitor providing said signals to respective inputs of said differential amplifier.

* * * * *